US010889443B2

(12) United States Patent
Behrens et al.

(10) Patent No.: US 10,889,443 B2
(45) Date of Patent: Jan. 12, 2021

(54) POCKET-TYPE CONVEYOR BELT INSTALLATION

(71) Applicant: ContiTech Transportbandsysteme GmbH, Hannover (DE)

(72) Inventors: Carsten Behrens, Bilshausen (DE); Olaf Kluth, Hannover (DE); Jens Schlomski, Duderstadt (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 16/603,539

(22) PCT Filed: Feb. 1, 2018

(86) PCT No.: PCT/EP2018/052463
§ 371 (c)(1),
(2) Date: Oct. 7, 2019

(87) PCT Pub. No.: WO2018/184749
PCT Pub. Date: Oct. 11, 2018

(65) Prior Publication Data
US 2020/0031580 A1    Jan. 30, 2020

(30) Foreign Application Priority Data

Apr. 7, 2017    (DE) .................. 10 2017 206 002

(51) Int. Cl.
*B65G 15/08*    (2006.01)
*B65G 15/60*    (2006.01)
(Continued)

(52) U.S. Cl.
CPC .............. *B65G 15/08* (2013.01); *B65G 15/60* (2013.01); *B65G 21/14* (2013.01); *B65G 43/02* (2013.01);
(Continued)

(58) Field of Classification Search
CPC ........ B65G 15/08; B65G 15/30; B65G 15/60; B65G 17/04; B65G 21/14; B65G 43/02;
(Continued)

(56) References Cited

U.S. PATENT DOCUMENTS 3,602,041 A    8/1971    Weinert
4,475,409 A    10/1984    Zulliger
(Continued)

FOREIGN PATENT DOCUMENTS

DE    3303469 A1    10/1983
EP    0718218 A2    6/1996
(Continued)

OTHER PUBLICATIONS

International Search Report dated Apr. 25, 2018 of International Application PCT/EP2018/052463 on which this application is based.

*Primary Examiner* — Gene O Crawford
*Assistant Examiner* — Lester Rushin, III
(74) *Attorney, Agent, or Firm* — Gregory Adams; David Cate

(57) ABSTRACT

The present invention relates to a pocket-type conveyor belt installation (2) having a plurality of carrying rollers (21) which are designed to support a pocket-type conveyor belt (1), preferably a lower conveyor belt edge (12) of a pocket-type conveyor belt (1), wherein the carrying rollers (21) are each connected in load-bearing fashion by means of at least one carrying roller holder (22) to a carrying frame (23) of the pocket-type conveyor belt installation (2). The pocket-type conveyor belt installation (2) is characterized in that at least one carrying roller holder (22), preferably a plurality of carrying roller holders (22), has at least one sensor element (4), which is arranged and designed to record at least a force and/or a change in force between the carrying roller (21) and the carrying frame (23).

20 Claims, 2 Drawing Sheets

Figure 1:
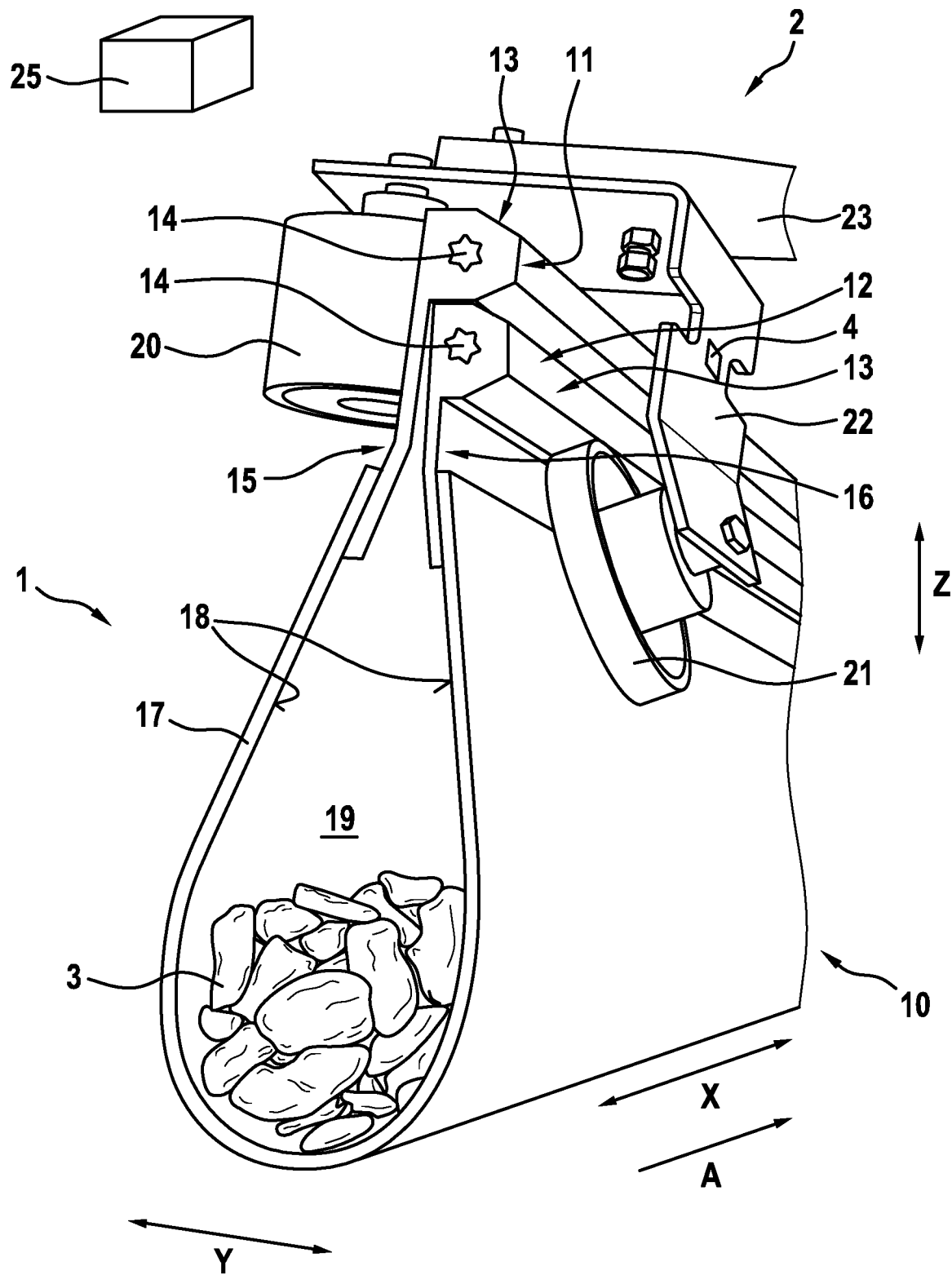

(51) Int. Cl.
*B65G 21/14* (2006.01)
*B65G 43/02* (2006.01)
*B65G 43/08* (2006.01)

(52) U.S. Cl.
CPC .......... *B65G 43/08* (2013.01); *B65G 2201/04* (2013.01); *B65G 2203/0275* (2013.01); *B65G 2203/0291* (2013.01)

(58) Field of Classification Search
CPC ................ B65G 43/08; B65G 2201/04; B65G 2203/0275; B65G 2203/0291
See application file for complete search history.

(56) References Cited

U.S. PATENT DOCUMENTS

| | | | |
|---|---|---|---|
| 8,191,883 B2 * | 6/2012 | Bader | B65H 39/02 |
| | | | 270/52.14 |
| 9,108,800 B2 * | 8/2015 | Raaz | B65G 15/40 |
| 10,150,621 B2 * | 12/2018 | Chlebovec | B65G 15/08 |
| 10,564,026 B2 * | 2/2020 | Welle | G01F 1/80 |
| 2012/0012443 A1 * | 1/2012 | Sakaguchi | B65G 43/02 |
| | | | 198/824 |

FOREIGN PATENT DOCUMENTS

| | | |
|---|---|---|
| JP | 2000025920 A | 1/2000 |
| JP | 2014227229 A | 12/2014 |
| KR | 100752124 B1 | 8/2007 |
| WO | 2013149292 A1 | 10/2013 |
| WO | 2017016666 A1 | 2/2017 |

\* cited by examiner

POCKET-TYPE CONVEYOR BELT INSTALLATION

The present invention relates to a pocket-type conveyor belt installation.

In the field of conveying technology, a conveyor belt type called SICON® is known which is described for example in EP 0 286 637 B1. A SICON conveyor belt has two steel cables as tension members in the longitudinal direction, i.e. in the movement direction of the conveyor belt, each of which is vulcanized into the two side edge regions in the longitudinal direction. The edge regions can also be referred to as conveyor belt edges, which are guided one above the other in operation in the closed state of the SICON conveyor belt. The two edge regions have profiles around the steel cables which may be guided substantially jointly by corresponding rollers of a conveyor belt installation, so that the conveyor belt can be held hanging downward. The function of these rollers is to guide the edge regions towards each other and, at the same time, press them against each other, and therefore they can also be referred to as running rollers, guide rollers, carrying rollers or tensioning rollers. In some cases, some or all rollers may also be driven in order to move the SICON conveyor belt in the conveying direction.

In this way, for closed transport of loose conveyed material, a SICON conveyor belt may be folded up in the manner of a pocket, and therefore the two edge regions can be guided lying one above the other. The surface of the SICON conveyor belt lying in between thus hangs freely downward and carries the conveyed material enclosed therein. A SICON conveyor belt may therefore also be described as a pocket-type conveyor belt or pocket-type conveyor. The SICON conveyor belt may be opened and closed at the input and output locations by corresponding guides.

In SICON conveyor belts, it is advantageous that the SICON conveyor belt or corresponding SICON conveyor belt installation takes up little space and may therefore be used in constricted situations. This also applies to overcoming height differences in constricted situations. Normally, height differences with gradients of up to around 35° can be overcome by a SICON conveyor belt closed in the manner of a pocket, wherein the conveyed material is compressed inside the pocket or bag and may thereby be held by force fit.

During the operation of a SICON conveyor belt installation, the question of recording the mass flow delivered by the SICON conveyor belt may arise. This recording is usually accomplished by uncoupling the retention points of entire carrying frame segments of the SICON conveyor belt installation from the normal path, and this may therefore require considerable structural measures in the design of the installation. This likewise usually involves considerable "dead weight fraction" within the measuring chain, which in some cases may significantly exceed the actual weight of the stream of conveyed material to be measured and may therefore have a negative effect on the quality of measurement both in respect of resolution and sensitivity.

A knowledge of the mass flow of the SICON conveyor belt may be required, for example, in the case of downstream mixing processes or indeed in the case of an operating speed of revolution matched to the delivery flow. In the latter case, optimization of the degree of filling of the pocket of the SICON conveyor belt may be performed to the effect that a lower mass flow conveyed can lead to a lower speed of the SICON conveyor belt at a constant filling level. It is thereby possible to reduce the power consumption, thereby making it possible at the same time to achieve a reduction in alternating bending stresses on the belt system over time due to bends and deflection drums. This can extend the life of the SICON conveyor belt.

An object of the present invention is to provide a pocket-type conveyor belt or pocket-type conveyor belt installation of the kind described at the outset, thus enabling the weight of the received conveyed material to be recorded more easily than was previously known. It is at least the intention to provide an alternative pocket-type conveyor belt installation.

The object is achieved according to the invention by a pocket-type conveyor belt installation.

The present invention thus relates to a pocket-type conveyor belt installation having a plurality of carrying rollers which are designed to support a pocket-type conveyor belt, preferably a lower conveyor belt edge of a pocket-type conveyor belt, wherein the carrying rollers are each connected in load-bearing fashion by means of at least one carrying roller holder to a carrying frame of the pocket-type conveyor belt installation.

Such designs of pocket-type conveyor belt installations are known. In this case, the pocket-type conveyor belt can be carried by individual carrying rollers, which can be secured jointly on one carrying frame or individually on a plurality of carrying frames or severally directly or indirectly via carrying roller holders. By rolling support of the load, said carrying frame can absorb the load or force that results from the weight of the pocket-type conveyor belt and the weight of the conveyed material received and, along the line, can transmit said load or force upward into the frame structure of the pocket-type conveyor belt installation, for example, via mechanical fastening elements, e.g. screws or clips.

According to the invention, at least one carrying roller holder, preferably a plurality of carrying roller holders, has at least one sensor element, which is arranged and designed to record at least a force and/or a change in force between the carrying roller and the carrying frame. In this way, it is possible for the first time to record at this point a force as an absolute or a relative value or a change in this value by sensor means. It is thereby possible to provide a pocket-type conveyor belt installation with a weighing function. This information can be utilized in many ways for operating the pocket-type conveyor belt installation, as will be described in greater detail below.

It may be advantageous here if one conveyor belt edge of the pocket-type conveyor belt, such as, in particular, the lower conveyor belt edge of the pocket-type conveyor belt is supported by the carrying roller, the load of which can be recorded by sensor means, since a pocket-type conveyor belt can transfer the greater part of its total weight to the corresponding carrying roller via the lower conveyor belt edge, thus making it possible to obtain as high as possible a measured value in this way. This can improve the accuracy of measurement. The actual total weight can also be recorded with the greatest accuracy at this point.

In principle, all that is required here to perform the weighing function is a support arm provided with appropriate sensor technology. However, it may be advantageous to provide each of a plurality of carrying roller holders with a sensor element, thus enabling the force or changes in force to be recorded at several points in the pocket-type conveyor belt installation. It is thereby possible, for example, to enhance measurement accuracy, i.e. the quality of the measurement data, by accumulation or statistical algorithms. For example, a plurality of recorded measured values or all the recorded measured values can be averaged in order to obtain a single representative overall measured value, the quality and therefore informativeness of which can be all the greater, the more measured values are used.

It may be advantageous here to connect a plurality of sensors in series since in this way any alignment errors of the individual support arms over the extent of the pocket-type conveyor belt installation can be balanced out because the values of signals of successive support arms can be averaged. This can improve the quality of measurement.

In this arrangement, the sensor element should preferably be positioned at the point where the greatest force can be expected to be introduced into the carrying roller holder or through the carrying roller holder. It is thereby possible to increase the level of the measured value, which can enhance the quality of measurement.

According to one aspect of the present invention, the sensor element has at least one strain gauge or is designed as a strain gauge. As a result, simple, low-cost and/or direct recording of the force or of the change in force can take place at the location of the carrying roller holder. In particular, a strain gauge can be quickly and easily mounted on the surface and also removed and replaced when damaged, for example, by adhesive bonding, for example.

In this case, it is also possible for a plurality of strain gauges to be used jointly and recorded individually or in combination, in series and/or in parallel.

According to another aspect of the present invention, the sensor element has at least one load cell or is designed as a load cell. It is thereby possible to provide an additional or alternative possibility for recording a force or change in force. A load cell can be mounted on the carrying roller holder or integrated into the carrying roller holder. It is also possible for a plurality of load cells to be used jointly and recorded individually or in combination, in series and/or in parallel. This also applies to the combination of a strain gauge or a plurality of strain gauges with a load cell or a plurality of load cells.

According to another aspect of the present invention, the carrying roller holder has a neck, preferably in the longitudinal direction, wherein the sensor element is arranged in the region of the neck. Force transmission via the carrying roller holder can thereby be channeled and thus enhanced at the location of the neck, making it possible to record a higher measured value at this location by means of the sensor element, and this can improve the quality of measurement.

Providing the neck in the longitudinal direction here can be advantageous because the carrying roller holder is usually a flat design in the transverse direction in order to minimize the space requirement of the pocket-type conveyor belt installation in the transverse direction. A relatively wide extent of the carrying roller holder in relation to the transverse direction is thereby obtained in the longitudinal direction, and therefore a neck in the longitudinal direction can lead to effective channeling into a relatively narrow region in which force transmission can be recorded in a particularly informative way, preferably by a single sensor element.

According to another aspect of the present invention, the sensor element is connected or can be connected in a wired or wireless manner to a control unit in order to transmit signals. This enables a measured value to be converted from the sensor signal, e.g. that of a strain gauge, in the control unit. It is also possible for this to be preceded by the use of signal filtering, which can be integrated both into the sensor element and into the control unit. As an alternative, a measured value that can be made available to the control unit may already be present at the sensor element, e.g. in the form of a load cell.

In both cases, this can take place in a wired manner via a cable, which may be economical and simple. As an alternative, this can also take place in a wireless manner, with the sensor element being designed as an RFID sensor element, for example, or having an RFID element; in this case, the control unit is likewise designed to receive the signal at least in a wireless manner. In both cases, there can be unilateral transmission of sensor values or of measured data from the sensor element to the control unit. In addition, if appropriate, there can also be data transmission from the control unit to the sensor element, in order, for example, to activate, deactivate, calibrate etc. said element by means of commands.

According to another aspect of the present invention, the control unit is designed to exercise open-loop and/or closed-loop control at least over a conveying speed in the conveying direction of the pocket-type conveyor belt in accordance with the recorded force and/or change in force. This makes it possible, for example, to perform open-loop or closed-loop control of a mass flow resulting from the conveying speed or speed of revolution of the pocket-type conveyor belt and the distance between the carrying roller holders along the pocket-type conveyor belt installation. In other words, it is possible in this way to exercise control of mass flows or of conveyed-material partial flows in the conveying process. This can be implemented, for example, by virtue of the fact that open-loop or closed-loop control can be exercised over a lateral discharge of the conveyed material, taking into account the recorded force or change in force, on the basis of the use of the weighing function according to the invention directly before and after the discharge by appropriate control of the "bulk product switch" within the discharge chute; this can be performed instead of the previously customary 1/0 control process.

According to another aspect of the present invention, the sensor element is designed to be electrically supplied in a wired or wireless manner. It is thereby possible to ensure the electric supply of the sensor element in various ways.

According to another aspect of the present invention, the carrying roller holder is designed to be replaceable with the sensor element. In other words, the carrying roller holder can be replaced together with the sensor element. This makes it possible to retrofit the weighing function according to the invention, e.g. retrospectively, in the case of an existing pocket-type conveyor belt installation, by replacing at least one sensor-less carrying roller holder with a carrying roller holder according to the invention, and therefore this function does not have to be taken into account already at the time when the installation is being designed.

According to another aspect of the present invention, the sensor element is furthermore designed to record a temperature at the location of the carrying roller holder. As a result, this information too can be used for the open-loop and/or closed-loop control of the pocket-type conveyor belt installation.

In other words, according to the present invention, it is possible very generally to equip a pocket-type conveyor belt installation, from the outset or by means of a simple retrofit system for the replacement of already existing carrying elements with components optimized by means of appropriate sensor technology, to use the weighing function according to the invention. By interconnection of carrying roller holders equipped with sensor elements as a unit over a corresponding line length, it is possible to reduce to a minimum both down times of the installation and the structural outlay in the installation. Moreover, a large number of (additional) functions apart from the actual mass flow determination can be offered to the operator of the installation, as a plug and play system for example.

(Additional) functions that may be mentioned are, for example:

1. Mass flow determination
2. Filling level monitoring
3. Adaptation of the conveying speed in the case of frequently changing states of loading
4. Extension of the life of the belt system resulting from points 2 and 3, by virtue of reduced load cycle figures in operation
5. Cost and energy saving for the conveying system resulting from points 2 and 3, by virtue of a reduced speed of revolution in operation
6. Variable bulk product control through the additional implementation of a controlled bulk product switch in the case of lateral discharge (chute with switch)

By means of a central or, alternatively, a plurality of locally positioned and cable-fed or, alternatively, radio-supported energy supply and evaluation units, the information flow can be transmitted to the user for further use (including the (additional) functions), recorded, stored and used for appropriate installation and process control.

In this case, the evaluation unit is preferably already equipped with an industry-standard interface system, which likewise makes retrofit implementation of the measuring equipment considerably easier.

Moreover, the positioning of the individual sensors on the support arm or on the carrying roller holder (on the arm itself or within the fastening element) allows both simple retrofitting (by replacement) and incorporation already at the time of initial design through the use of this identically dimensioned support arm structure instead of standard support arms.

Figure 2:
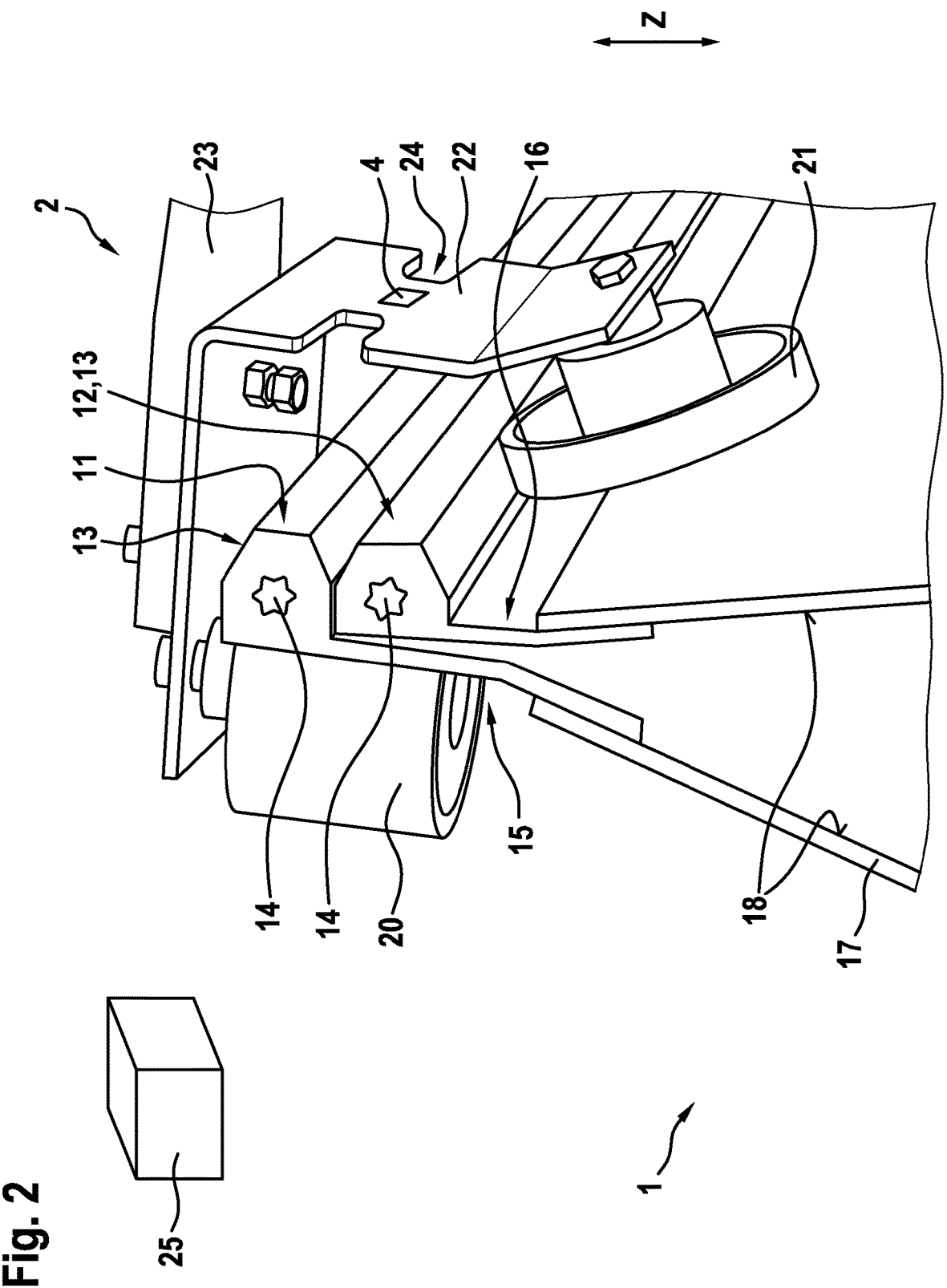

An exemplary embodiment and further advantages of the invention will be discussed below in conjunction with the following figures, in which:

FIG. 1 shows a perspective, diagrammatic, cross-sectional depiction of a pocket-type conveyor belt installation according to the invention with a known pocket-type conveyor belt; and FIG. 2 shows a detail view of FIG. 1.

The description of the abovementioned figures is given in Cartesian coordinates with a longitudinal direction X, a transverse direction Y which is oriented perpendicularly in relation to the longitudinal direction X, and a vertical direction Z which is oriented perpendicularly both in relation to the longitudinal direction X and also in relation to the transverse direction Y. The longitudinal direction X can also be referred to as the depth direction X, the transverse direction Y can also be referred to as the width direction Y, and the vertical direction Z can also be referred to as the height Z.

FIG. 1 shows a known pocket-type conveyor belt 1 in a pocket-type conveyor belt installation 2 according to the invention. The pocket-type conveyor belt 1 has a conveyor belt body 10 which could also be described as a pocket 10 or a bag 10, and is made of an elastomer material. On the outside in the transverse direction Y, the conveyor belt body 10 has a first conveyor belt edge 11 and a second conveyor belt edge 12, which are arranged one above the other in the closed state of the pocket-type conveyor belt 1, so that the first conveyor belt edge 11 may be called the upper conveyor belt edge 11, and the second conveyor belt edge 12 may be called the lower conveyor belt edge 12. A steel cable 14, which is continuous in the longitudinal direction X, extends as a tension member 14 within each of the two conveyor belt edges 11, 12.

The two conveyor belt edges 11, 12 make a downward transition into respective contact regions 15, 16 which may also be called tabs 15, 16. A pocket body 17 is connected on each side to the contact regions 15, 16, and a conveyed material 3 such as e.g. a bulk product 3 may be received on its top side as a carrying side 18. In the closed state, the carrying side 18 of the pocket body 17 surrounds the conveyed material 3 in the transverse direction Y and in the vertical direction Z, so that the carrying side 18 may then be described as the inside 18, which encloses an interior 19 of the pocket-type conveyor belt 1.

Each of the two conveyor belt edges 11, 12 has a profile 13, which serves for holding by correspondingly arranged rollers 20, 21 of the pocket-type conveyor belt installation 2, which are each arranged in pairs. Each pair of rollers 20, 21 has a laterally arranged tensioning roller 20, which presses the two conveyor belt edges 11, 12 against one another in the transverse direction Y, and a carrying roller 21, which is arranged obliquely below the lower conveyor belt edge 12 and which essentially carries the weight of the pocket-type conveyor belt 1, together with the conveyed material 3. The mutual spacing of the two rollers 20, 21 or their spacing from the conveyor belt edges 11, 12 is selected such that the pocket-type conveyor belt 1 can move in the movement direction A along the longitudinal direction X, and at the same time the conveyor belt edges 11, 12 can be securely held and guided when passing through the pair of rollers 20, 21.

The tensioning roller 20 and the carrying roller 21 are connected via a carrying roller holder 22 to the carrying frame 23, which is arranged above the rollers 20, 21 and the pocket-type conveyor belt 1.

According to the invention, the carrying roller holder 22 has a sensor element 4, which can record the force or change in force which is transmitted from the carrying roller 21 to the carrying frame 23 via the carrying roller holder 22. In this case, the sensor element 4 is designed as a strain gauge 4, which is adhesively bonded onto the carrying roller holder 22 in the transverse direction Y from the outside at the points where said holder has a neck 24 in the longitudinal direction X. Load transmission can thereby be channeled at the location of the neck 24 and can be better recorded by the strain gauge 4.

The pocket-type conveyor belt installation 2 has a control unit 25, which is connected to the strain gauge 4 by a signal-carrying line, i.e. in a wired manner. This enables the recorded load to be used during operation, e.g. for control of the mass flow of the pocket-type conveyor belt installation 2.

LIST OF REFERENCE SIGNS (PART OF THE DESCRIPTION)

A Movement direction/conveying direction of pocket-type conveyor belt 1
X Longitudinal direction; depth
Y Transverse direction; width
Z Vertical direction; height
1 Pocket-type conveyor belt; SICON conveyor belt
10 Conveyor belt body; pocket; bag
11 First, upper conveyor belt edge
12 Second, lower conveyor belt edge
13 Profiles of conveyor belt edges 11, 12
14 tension member; steel cables 15 Contact region/tab of first, upper conveyor belt edge 11
16 Contact region/tab of second, lower conveyor belt edge 12
17 Pocket body
18 Carrying side of pocket-type conveyor belt 1; inside of closed pocket-type conveyor belt 1
19 Interior of closed pocket-type conveyor belt 1
2 Pocket-type conveyor belt installation
20 Tensioning roller
21 Carrying roller
22 Carrying roller holder
23 Carrying frame
24 Neck of the carrying roller holder 22
25 Control unit
3 Conveyed material; bulk product
4 Sensor element

The invention claimed is:

1. A pocket-type conveyor belt installation comprising:
a plurality of carrying rollers designed to support a pocket-type conveyor belt, wherein the pocket-type conveyer belt includes a lower conveyor belt edge;
a plurality of carrying roller holders designed to connect the plurality of carrying rollers to a carrying frame;
wherein a carrying roller holder of the plurality of carrying roller holders includes a sensor element designed to record at least a force and/or a change in force; and
wherein the sensor element is further designed to record a temperature at the location of the carrying roller holder.

2. The pocket-type conveyor belt installation as claimed in claim 1, wherein the sensor element comprises at least one strain gauge.

3. The pocket-type conveyor belt installation as claimed in claim 1, wherein the sensor element comprises at least one load cell.

4. The pocket-type conveyor belt installation as claimed in claim 1, wherein
the carrying roller holder has a neck in the longitudinal direction (X) and the sensor element is arranged in the region of the neck.

5. The pocket-type conveyor belt installation as claimed in claim 1, wherein
the sensor element is connected in one of a wired or wireless manner to a control unit in order to transmit signals.

6. The pocket-type conveyor belt installation as claimed in claim 5, wherein
the control unit is designed to exercise open-loop and/or closed-loop control at least over a conveying speed in the conveying direction (A) of the pocket-type conveyor belt in accordance with the recorded force and/or change in force.

7. The pocket-type conveyor belt installation as claimed in claim 1, wherein the sensor element is designed to be electrically supplied in a wired or wireless manner.

8. The pocket-type conveyor belt installation as claimed in claim 1, wherein the carrying roller holder is designed to be replaceable with the sensor element.

9. The pocket-type belt conveyor belt installation of claim 1, wherein the pocket-type conveyer belt further includes an upper conveyer belt edge and the lower conveyor belt edge is positioned below the upper conveyor belt edge.

10. The pocket-type belt conveyor belt installation of claim 9, further comprising a plurality of tensioning rollers and designed to engage the upper conveyer belt edge.

11. The pocket-type conveyor belt installation of claim 10, further comprising a control unit coupled to the sensor element, the control unit designed to determine mass flow, monitor filling level, adapt a conveying speed of the pocket-type conveyer belt based on the recorded force and recorded force information.

12. The pocket-type conveyor belt installation of claim 11, wherein the control unit is designed to control bulk product by a product discharge chute switch based on the recorded force and the recorded force information.

13. The pocket-type conveyor belt installation of claim 12, further comprising an evaluation unit configured to store the recorded force information.

14. The pocket-type conveyor belt installation of claim 13, further comprising one or more additional sensor elements designed to record additional force information and wherein the stored recorded force information includes the recorded additional force information.

15. A pocket-type conveyor belt installation comprising:
a plurality of carrying rollers designed to support a pocket-type conveyor belt, wherein the pocket-type conveyer belt includes a lower conveyor belt edge;
a plurality of carrying roller holders designed to connect the plurality of carrying rollers to a carrying frame;
wherein a carrying roller holder of the plurality of carrying roller holders includes a sensor element designed to record at least a force and/or a change in force;
wherein the sensor element is connected in one of a wired or wireless manner to a control unit in order to transmit signals; and
wherein the control unit is designed to exercise open-loop and/or closed-loop control at least over a conveying speed in the conveying direction (A) of the pocket-type conveyor belt in accordance with the recorded force and/or change in force.

16. The pocket-type conveyor belt installation as claimed in claim 15, wherein
the sensor element comprises at least one strain gauge.

17. The pocket-type conveyor belt installation as claimed in claim 15, wherein the sensor element comprises at least one load cell.

18. The pocket-type conveyor belt installation as claimed in claim 15, wherein
the carrying roller holder has a neck in the longitudinal direction (X) and the sensor element is arranged in the region of the neck.

19. The pocket-type belt conveyor belt installation of claim 15, further comprising a plurality of tensioning rollers and designed to engage the upper conveyer belt edge.

20. The pocket-type conveyer belt installation of claim 15, the control unit designed to determine mass flow, monitor filling level, adapt a conveying speed of the pocket-type conveyer belt based on the recorded force and recorded force information.

* * * * *